United States Patent Office 2,823,107
Patented Feb. 11, 1958

2,823,107

INORGANIC MICRO-NUTRIENT COMPLEXES

John R. Allison, Whittier, Calif., assignor to Leffingwell Chemical Company, Whittier, Calif., a corporation of California No Drawing. Application June 13, 1955
Serial No. 515,227

6 Claims. (Cl. 71—32)

This invention has to do with improvements in inorganic micro-nutrient complexes used by application to plant foliages to improve in such respects as hereinafter mentioned, the growth and productive characteristics of the plants so treated. More specifically, the invention relates to inorganic micro-nutrient complexes so composed as to supply to the plants' deficiencies mainly in phosphorous, manganese, and zinc.

At the outset it may be mentioned that the term "complex" is used in reference to or designation of the present product, because of the complexities of its salt compositions and the absence of any known methods of analysis whereby the composition may be defined with exactness in terms of individual salts or relative proportions thereof.

Preliminarily it may be observed that the present product has its intended utility for application to plant foliages in a liquid carrier, which ordinarily will be water or a spray oil-water emulsion. Functionally, the invention involves the concept of making a water insoluble salt complex of zinc and manganese salts, inclusive of phosphate salts, which, after application to the plant foliage, has prolonged effectiveness in assuring the availability to and assimilation by the plant of zinc, manganese and phosphorous deficiencies, by reason of the action upon the salt complex of a neutral to slightly acid condition of the plant foliage surface. Thus, although having substantial water insolubility, the complex is capable in the presence of slight acidity created naturally by the plant on its foliage surfaces, and resulting also from atmospheric carbon dioxide, of releasing the named metallic elements for plant assimilation. Included in the complex may be a salt or salts of copper where, in particular instances, the presence of copper may be beneficial to the plants.

I may cite as illustrative, definitely beneficial results from the spray treatment of certain typical crop plants. The yield of tomatoes has been increased up to 100% per acre, and sugar beets have been found to have their sugar content increased up to 50%. The maturity of grapes has been accelerated by as much as twelve days, with 40% increase in the crop production. The present material has been observed to effectively correct the zinc, manganese and phosphorous conditions in the plants and to definitely benefit the quality of the fruit. As to navel oranges, maturity has been accelerated by as much as two weeks, the fruit size increased by one size gradation, and the yield by as much as 25%. Apples have been benefitted by improved keeping qualities and accelerated maturity.

The present method and resulting product may be described generally as involving the mixing and reaction, particularly in the later described steps or stages, of quicklime, zinc sulfate (e. g., containing 36% zinc), copper sulfate if desired, phosphoric acid (e. g. 75% solution), manganese sulfate or manganese carbonate or mixtures thereof, to produce a slurry salt complex which upon spray drying, i. e. dispersion through one or more spray nozzles in an air drying atmosphere, results in a finely divided product the particle size of which is predominantly under 250 mesh.

In accordance with the invention, the first procedural step is to admix with a saturated or somewhat less than saturated aqueous quicklime mixture, zinc sulfate preferably in a close to saturated solution of the salt, which results principally in the formation of zinc hydroxide, zinc basic sulfate and calcium sulfate, practically all the calcium being precipitated as sulfate. Where copper is desired in the final product, copper may be introduced to the quicklime and zinc sulfate mixture as copper sulfate. To the resulting mixture is added phosphoric acid to form an initial complex containing in addition to precipitated calcium sulfate, zinc basic phosphate formed at the expense of some of the zinc hydroxide, and zinc basic sulfate formed as a result of the quicklime and zinc sulfate reaction. To the slurry thus formed is added an aqueous slurry of manganese carbonate or manganese sulfate, or a mixture thereof. Primarily by controlling the quantity of quicklime in relation to the other compounds reacted as described, this final slurry mixture preferably is controlled as to alkalinity, to have a pH between about 6.9 to 8.2.

The effect of the three step reactions is to produce a salt complex, the exact composition of which is not known or determinable by any methods of analysis of which I am aware. The complex is believed to contain among its principal ingredients some zinc hydroxide, basic zinc sulfate, zinc basic phosphate, manganese carbonate, and calcium sulfate. When used as previously indicated, copper may be present in forms similar to the zinc compounds. Whatever the exact chemical identity of the salt complex or complexes may be, they are found to contain the essential elements zinc (optionally copper also), manganese, and phosphorous in forms capable of highly effective assimilation by the plants when given spray application to their foliage.

Relative to the quantity ranges of the inorganic compounds to be admixed and reacted in accordance with the invention, the relative amounts thereof are governed primarily to give the essentially required metal concentrations in the final spray dried product. As previously indicated, the quantity of quicklime used may be determined on the basis of the desirable 6.9 to 8.2 pH range of the final slurry complex. The zinc sulfate, copper sulfate, manganese carbonate or sulfate and phosphoric acid quantities are predetermined to give to the final spray dried product zinc content within the range of about 10% to 20%, manganese 5% to 16%, copper 4% to 20% and phosphorous, calculated as $P_2O_5$, between about 5.5% to 20%. It has been found through extensive experimentation that maintenance of the phosphorous content within this range is of essential importance to making available to the plant foliage at full advantage, the zinc, manganese, and copper content of the product.

The following examples are given of typical procedures and products within the scope and contemplation of the invention:

*Example 1*

About 630 pounds of quicklime is put into 250 gallons of water, to which is added, and thoroughly mixed therewith, about 1,600 pounds in 300 gallons of water of 36% zinc sulfate. To the resulting solution is added 725 pounds of 75% phosphoric acid. Finally, I add to the resulting solution 800 pounds of manganese slurry containing about 35% manganese. The admixture has a pH of about 7.5, and has the physical form of a slurry suitable for spray drying.

The finely divided product resulting from spray drying the slurry complex analyzes to have a zinc content of about 14%, manganese about 7%, and phosphorous, calculated as $P_2O_5$, about 10%.

*Example 2*

Following the same procedure described in Example 1, but using 630 pounds of quicklime, 1,850 pounds of zinc sulfate, 375 pounds of phosphoric acid, and 800 pounds of manganese carbonate (manganese content 35%). As before, the slurry to be spray dried has a pH of about 7.5. The spray dried product contains about 16½% zinc, about 7% manganese, and about 5.5% $P_2O_5$.

The finely divided spray dried product may be given spray applications to the foliage to be treated, in different manners and in varying concentrations, depending upon the particular purpose to be served. For spray application in water, between about 5 to 25 pounds of the product is uniformly dispersed in 100 gallons of water, and applied to the foliage using conventional spray equipment. Depending upon the responses observed in the treatment of any particular crop, the number of applications may range from 1 to 4 per year. For application in oil emulsions, I first emulsify about 2 gallons of conventional spray oil in 100 gallons of water, and add thereto from 1 to 3 pounds of the complex salt product.

I claim:

1. The method of preparing a substantially water insoluble inorganic micro-nutrient complex material that comprises reacting an aqueous mixture of zinc sulfate and quicklime to produce zinc hydroxide, zinc basic sulfate and precipitated calcium sulfate, then adding thereto phosphoric acid to react with the zinc, then adding to the resulting mixture a manganese salt of the group consisting of manganese carbonate and manganese sulfate to form a salt complex having a pH within the range of about 6.9 to 8.2, and spray drying the resulting complex to form said material as a substantially water insoluble product in finely divided form containing between about 10% to 20% zinc, 5% to 16% manganese, and 5.5% to 20% phosphorous calculated as $P_2O_5$.

2. The method as defined in claim 1, in which said manganese salt is manganese carbonate.

3. The method as defined in claim 1, in which copper sulfate is added to the zinc sulfate-quicklime mixture and said finely divided product contains between about 4% to 20% copper.

4. The spray dried product made by the method of claim 1.

5. The spray dried product made by the method of claim 2.

6. The spray dried product made by the method of claim 3.

References Cited in the file of this patent

UNITED STATES PATENTS

| | | |
|---|---|---|
| 372,087 | Reese | Oct. 25, 1887 |
| 2,270,518 | Ellis | Jan. 20, 1942 |
| 2,350,982 | Borst | June 13, 1944 |
| 2,713,749 | Hult | July 26, 1955 |
| 2,760,866 | Nielsen | Aug. 28, 1956 |

OTHER REFERENCES

Chemical and Metallurgical Engineering—Spray Drying Insecticides and Allied, Alford, vol. 41, No. 12, page 634.